United States Patent [19]

Gray et al.

[11] 4,369,152
[45] Jan. 18, 1983

[54] MOLDING METHOD

[75] Inventors: John D. Gray, Rochester; Robert W. Dietrich, Dover; Peter A. Weller, Durham, all of N.H.

[73] Assignee: Ex-Cell-O Corporation, Troy, Mich.

[21] Appl. No.: 60,230

[22] Filed: Jul. 24, 1979

[51] Int. Cl.³ .............................................. B29F 1/10
[52] U.S. Cl. .................... 264/46.4; 264/251; 264/257
[58] Field of Search ................ 264/251, 257, 46.4

[56] References Cited

U.S. PATENT DOCUMENTS 3,950,483  4/1976  Spier ................................. 264/46.4

Primary Examiner—V. P. Hoke
Attorney, Agent, or Firm—McGlynn and Milton

[57] ABSTRACT

A method of molding a plastic component having first and second portions interconnected by a transition zone with a barrier material encapsulated in the plastic material of both of the portions of the component. The permeable barrier material is placed in a mold cavity to divide the cavity into first and second portions. The first portion of the cavity is filled with plastic material while the second portion of the cavity is filled with plastic material to permeate the barrier material with plastic from both portions whereby the barrier material defines the transition zone and is encapsulated in the plastic component.

5 Claims, 2 Drawing Figures

MOLDING METHOD

BACKGROUND OF THE INVENTION

The subject invention relates to the molding of plastic components and is particularly well-suited for the molding of automotive fascias, an automotive fascia being the plastic component defining either the front or rear end of the exterior body.

Such plastic components must include certain surface finishes, must possess certain strength characteristics and must be capable of being painted. When molding such plastic components the liquid plastic material injected into a mold cavity flows throughout the mold cavity. However, it is frequently difficult to control the flow of the liquid plastic material throughout the mold cavity and, as a result, air is frequently entrapped in the part as the injected plastic material follows different flow paths and then meets to knit together and form the continuous part. It sometimes occurs that the location of the knitting of the plastic flows together is undesirable.

SUMMARY OF THE INVENTION

In accordance with the subject invention the position of the knitting together of a plurality of flows of plastic material in a mold can be controlled by placing a permeable barrier material in the mold cavity to divide the cavity into first and second portions and filling the first portion of the cavity with plastic material while filling the second portion of the cavity with plastic material to permeate the barrier material with plastic material from both portions of the cavity whereby the barrier material defines a transition zone and is encapsulated in the plastic component.

PRIOR ART STATEMENT

Molding techniques are known in the prior art wherein a plastic component is made of dissimilar plastic materials which intermix at transition zones to provide a one-piece component with strong chemical and-/or mechanical bonds at the transition zones. Such is accomplished by varying the starting materials selected, the volume of starting materials used, injection speed, injection pressure, temperature, etc. Such is illustrated in U.S. Pat. No. 3,950,483, granted Apr. 13, 1976, to Spier. The subject invention provides an improved method for controlling the transition zone between two flows of plastic material into a mold cavity whether the plastic materials be the same or dissimilar.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE INVENTION

Figure 1:
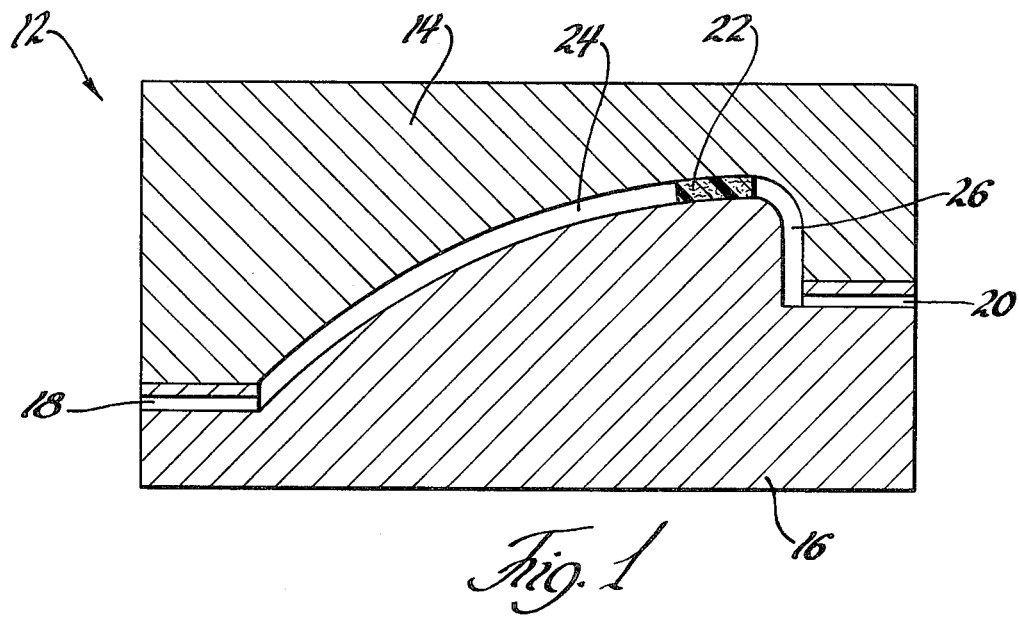
FIG. 1 is a cross-sectional view of a mold showing a mold cavity with a permeable barrier disposed therein.
Figure 2:
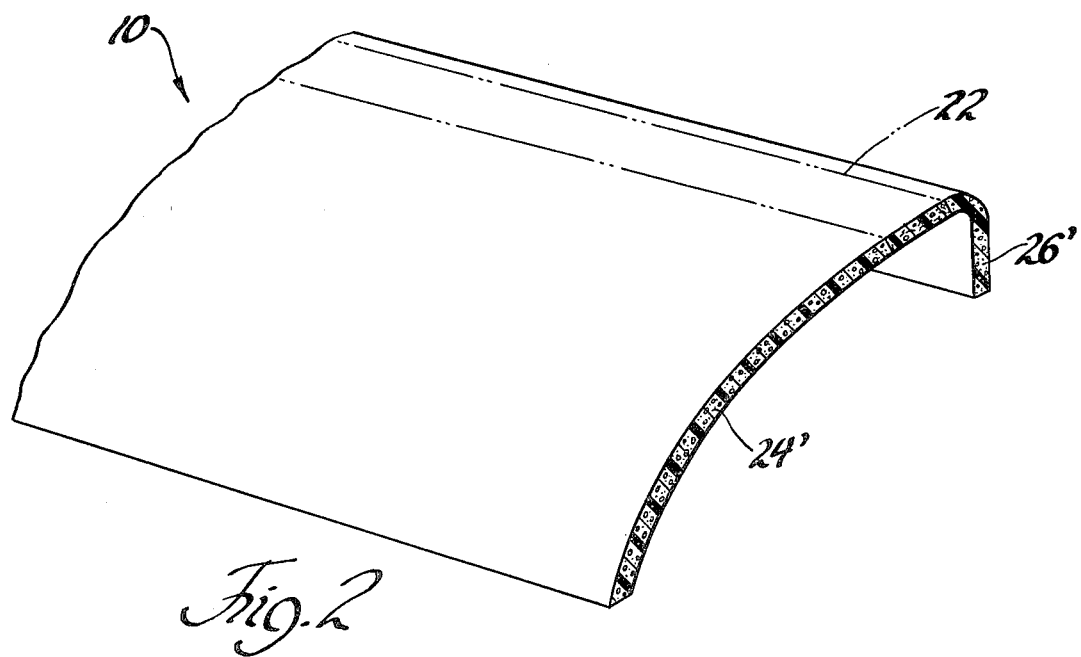
FIG. 2 is a perspective cross-sectional view showing a plastic component molded in the mold of FIG. 1 and in accordance with the subject invention.

The subject invention relates to a plastic component such as that generally shown at 10 in FIG. 2 which is made in a mold generally shown at 12 in FIG. 1. In accordance with the method of the subject invention, the plastic component 10 is made in a mold 12 having a mold cavity therein. The mold 12 is defined by an upper mold half 14 and a lower mold half 16. The mold part 16 includes a first inlet 18 and a second inlet 20 for filling the mold cavity.

In accordance with the method a permeable barrier material or strip 22 is placed in the mold cavity to divide the mold cavity into first and second portions 24 and 26 respectively. Specifically, the permeable barrier material 22 placed in the cavity may be made of various materials including any one of a glass matting, nylon matting, reticulated foam and an open-celled foam.

Once the barrier 22 is placed within the mold cavity and the mold is closed to the position shown in FIG. 1, liquid plastic material such as a urethane is injected into the mold cavity. Specifically, the first portion 24 of the cavity is filled with plastic material through the first inlet 18 while, at the same time, the second portion 26 of the cavity is filled with plastic material through the second inlet 20 to permeate the barrier 22 with plastic material from both portions 24 and 26 of the cavity whereby the barrier material 22 defines a transition zone and is encapsulated in the plastic component 10, as illustrated in FIG. 2.

The plastic material injected through the inlets 18 and 20 may be the same material which intermix or knit at the barrier 22, the barrier 22 serving the function to locate the area in which the two plastic flows will knit together. Both plastic flows intermix at the barrier 22 and completely encapsulate the barrier 22 to form a smooth exterior surface.

Alternatively, the plastic material injected through the first inlet 18 into the first portion 24 of the cavity may be a dissimilar or different material from the plastic material injected through the second inlet 20 into the second portion 26 of the cavity.

In accordance with the method, the first portion 24 of the cavity may be filled through the inlet 18 over the same time period as the second portion 26 is filled through the second inlet 20. In such a manner the plastic materials injected through the inlet 18 will reach the barrier 22 at approximately the same time as the plastic materials injected through the inlets 20.

As illustrated in FIG. 2, the plastic component which results from the molding method illustrated in FIG. 1 includes a first portion 24' molded in the first portion 24 of the mold and a second portion 26' molded in the second portion 26 of the mold. The liquid plastic materials injected into the mold cavity solidify to form the plastic component 10. By utilizing two different materials one portion, e.g., the first portion 24', may be of a flexible material whereas the second portion 26' may be made of a rigid material, but the two materials are intermixed and encapsulate the matrix-like barrier 22.

One of the advantages of utilizing two different materials is in the manufacture of the fascias mentioned above wherein a fascia covering an energy-absorbing assembly may be flexible but will have formed integrally therewith rigid edges or flanges for attaching the fascia to the vehicle body.

It is to be understood that although the subject invention is illustrated utilizing two inlets 18 and 20, the subject invention is applicable to a single inlet where the barrier is utilized to control the position or location of the knit line.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A method of molding a plastic component in a mold having a mold cavity comprising the steps of: placing a permeable barrier material in the mold cavity to divide the cavity into first and second portions, filling the first portion of the cavity with plastic material while filling the second portion of the cavity with plastic material to permeate the barrier material with plastic material from both portions of the cavity whereby the barrier material defines a transition zone and is encapsulated in the plastic component.

2. A method as set forth in claim 1 further defined as filling the first portion of the cavity with plastic material different from the plastic material with which the second portion of the cavity is filled.

3. A method as set forth in claim 1 further defined as filling the first portion over the same time period the second portion is being filled.

4. A method as set forth in claim 1 further defined as filling the first portion of the cavity from a first inlet to the cavity and filling the second portion of the cavity from a second inlet to the cavity.

5. A method as set forth in claim 1 further defined as placing a permeable barrier material in the cavity which is made of any one of glass matting, nylon matting, reticulated foam and open-celled foam.

* * * * *